US012562498B2

(12) United States Patent
Menargues Gomez et al.

(10) Patent No.: US 12,562,498 B2
(45) Date of Patent: Feb. 24, 2026

(54) RADIOFREQUENCY MODULE

(71) Applicant: SWISSto12 SA, Renens (CH)

(72) Inventors: Esteban Menargues Gomez, Lausanne (CH); Santiago Capdevila Cascante, Renens (CH); Emile de Rijk, Lausanne (CH); Tomislav Debogovic, Chexbres (CH)

(73) Assignee: SWISSto12 SA, Renens (CH)

( * ) Notice: Subject to any disclaimer, the term of this patent is extended or adjusted under 35 U.S.C. 154(b) by 0 days.

(21) Appl. No.: 18/358,344

(22) Filed: Jul. 25, 2023

(65) Prior Publication Data

US 2023/0378659 A1 Nov. 23, 2023

Related U.S. Application Data

(63) Continuation of application No. 17/657,802, filed on Apr. 4, 2022, now Pat. No. 11,742,589, which is a (Continued)

(30) Foreign Application Priority Data

Jun. 1, 2018 (CH) ........................................ 699/18

(51) Int. Cl.
*H01Q 13/02* (2006.01)
*H01Q 13/06* (2006.01)
(Continued)

(52) U.S. Cl.
CPC ....... *H01Q 21/005* (2013.01); *H01Q 13/0275* (2013.01); *H01Q 13/06* (2013.01); *H01Q 15/24* (2013.01)

(58) Field of Classification Search
CPC .... H01Q 13/0275; H01Q 13/06; H01Q 13/02; H01Q 13/0258; H01Q 15/24;
(Continued)

(56) References Cited

U.S. PATENT DOCUMENTS 4,644,362 A 2/1987 Rammos
4,803,495 A * 2/1989 Monser ................ H01Q 21/064 343/777
(Continued)

FOREIGN PATENT DOCUMENTS

CN 107636900 A 1/2018
FR 3048556 A1 9/2017
WO 2016202394 A1 12/2016

OTHER PUBLICATIONS

International Search Report for PCT/IB2018/059734 dated Apr. 8, 2019.
(Continued)

*Primary Examiner* — Tho G Phan
(74) *Attorney, Agent, or Firm* — McDonald Hopkins LLC

(57) ABSTRACT

Radiofrequency module, including: a first layer including an array of radiating elements, each radiating element having a cross section for supporting at least one wave propagation mode, a second layer forming an array of waveguides; a fourth layer forming an array of ports; the second layer being interposed between the first and the fourth layer; each waveguide being connected to a port on the one hand and to a radiating element on the other hand for transmitting a radiofrequency signal between this port and this radiating element; the spacing between two ports being different from the spacing between the radiating elements, so that the surface area of the first layer is different from the surface area of the fourth layer; the waveguides being curved.

15 Claims, 12 Drawing Sheets

Related U.S. Application Data continuation of application No. 17/059,748, filed as application No. PCT/IB2018/059734 on Dec. 6, 2018, now Pat. No. 11,309,637.

(51) Int. Cl.
*H01Q 15/24* (2006.01)
*H01Q 21/00* (2006.01)

(58) Field of Classification Search
CPC .. H01Q 21/00; H01Q 21/0006; H01Q 21/005; H01Q 21/06; H01Q 21/064; H01P 1/16; H01P 1/161; H01P 1/18
See application file for complete search history.

(56) References Cited

U.S. PATENT DOCUMENTS

| | | | | |
|---|---|---|---|---|
| 4,811,028 | A * | 3/1989 | Bryanos | H01Q 13/0275 343/705 |
| 8,026,859 | B2 * | 9/2011 | McLean | H01Q 13/0275 343/862 |
| 8,957,820 | B2 | 2/2015 | Yamada | |
| 9,112,279 | B2 | 8/2015 | Montgomery et al. | |
| 9,472,853 | B1 | 10/2016 | Smith | |
| 9,923,256 | B2 * | 3/2018 | Jensen | H01P 3/123 |
| 9,991,607 | B1 | 6/2018 | West et al. | |
| 10,559,891 | B2 | 2/2020 | Biancotto et al. | |
| 10,566,701 | B2 | 2/2020 | Zadian | |
| 10,897,090 | B2 | 1/2021 | Navarro et al. | |
| 10,903,582 | B2 * | 1/2021 | Peng | H01Q 21/005 |
| 11,121,475 | B2 | 9/2021 | Yang et al. | |
| 11,177,580 | B2 * | 11/2021 | Wrigley | H01Q 13/0258 |
| 11,309,637 | B2 | 4/2022 | Menargues Gomez et al. | |
| 11,381,000 | B2 * | 7/2022 | You | H01Q 21/061 |
| 2003/0189515 | A1 | 10/2003 | Jacomb-Hood et al. | |
| 2009/0153426 | A1 | 6/2009 | Worl et al. | |
| 2011/0018758 | A1 | 1/2011 | Ecclestone | |
| 2012/0218160 | A1 | 8/2012 | Montgomery et al. | |
| 2016/0218436 | A1 | 7/2016 | Rao et al. | |
| 2017/0263391 | A1 | 9/2017 | Wakuda | |
| 2018/0287264 | A1 | 10/2018 | Walde et al. | |
| 2021/0167518 | A1 | 6/2021 | Achour et al. | |
| 2021/0359422 | A1 | 11/2021 | You et al. | |
| 2022/0109246 | A1 | 4/2022 | Emanuelsson et al. | |

OTHER PUBLICATIONS

Written Opinion for PCT/IB2018/059734 dated Apr. 8, 2019.
Translation of First Office Action and Search Report for corresponding Chinese application No. 201880093949.7 dated Mar. 18, 2023.

* cited by examiner

RADIOFREQUENCY MODULE

TECHNICAL FIELD

The present invention relates to a radiofrequency (RF) module intended to form the passive part of a direct radiating antenna (DRA, Direct Radiating Array).

PRIOR ART

Antennas are elements that serve to transmit electromagnetic signals in free space, or to receive such signals. Simple antennas, such as dipoles, have limited performance in terms of gain and directivity. Parabolic antennas provide higher directivity, but are bulky and heavy, making their use inappropriate in applications such as satellites, for example, where weight and volume need to be reduced.

Also known are antenna arrays (DRA) which combine a plurality of phase-shifted radiating elements (elementary antennas) in order to improve gain and directivity. The signals received on the different radiating elements, or transmitted by these elements, are amplified with variable gains and phase-shifted from one another in order to control the shape of the reception and transmission lobes of the array.

At high frequency, for example at microwave frequencies, each of the different radiating elements is connected to a waveguide which transmits the received signal toward electronic radiofrequency modules, or which supplies this radiating element with a radiofrequency signal to be transmitted. The signals transmitted or received by each radiating element may also be separated according to their polarization, using a polarizer.

The assembly formed by the radiating elements (elementary antennas) in an array, the associated waveguides, any filters that are used, and the polarizers is referred to in the present text as a passive radiofrequency module. The waveguides and the associated polarizers are referred to as a feed unit ("feed network"). The assembly is intended to form the passive part of a direct radiating array (DRA).

Arrays of radiating elements for high frequencies, notably microwave frequencies, are difficult to design. In particular, it is often desirable to place the different radiating elements of the array as closely together as possible, in order to reduce the amplitude of the secondary transmission or reception lobes in directions other than the transmission or reception direction which is to be given priority. However, this reduction of the spacing between the different radiating elements of the array is incompatible with the minimum size required by the polarizers, on the one hand, and with the overall dimensions of the electronic amplification and phase-shifting circuits upstream of the polarizers on the other hand.

Therefore the size of the polarizers and the electronic system usually determines the minimum spacing between the different radiating elements of an array. The resulting wide spacing gives rise to undesirable secondary transmission or reception lobes.

However, other radiofrequency modules require a wider spacing of the radiating elements, in order to provide them with a transmission cone, for example. It may also be desirable to modify the relative positioning of the radiating elements.

US2016/218436 discloses an integrated multi-beam antenna system for a satellite comprising a support structure with an alignment plate.

WO2016/202394 refers to a waveguide coupling for a radar antenna in the form of a linear scanner.

US2009/153426 discloses a structure and method for an aperture plate for use in a phased-controlled array antenna.

US2003/189515 refers to a phased array antenna design that is modular and scalable in terms of beam quantity, coverage area and sensitivity in reception and transmission.

BRIEF DESCRIPTION OF THE INVENTION

An object of the present invention is therefore to propose a passive radiofrequency module, intended to form the passive part of a direct radiating array (DRA), which is free of, or minimizes, the limitations of the known devices.

These aims are, notably, achieved by means of a radiofrequency module comprising:

- a first layer comprising an array of radiating elements, each radiating element having a cross section for supporting at least one wave propagation mode,
- a second layer forming an array of waveguides;
- a fourth layer forming an array of ports;
- the second layer being interposed between the first and the fourth layer;
- each waveguide being intended to transmit a radiofrequency signal in one or other direction between a port of the fourth layer and a radiating element;
- the surface area of the first layer being different from the surface area of the fourth layer;
- the waveguides approaching one another between the fourth layer and the first layer, or between the first layer and the fourth layer.

These aims are, in particular, achieved by means of a radiofrequency module comprising:

- a first layer comprising an array of radiating elements, each radiating element having a cross section for supporting at least one wave propagation mode, each section being provided with at least one ridge parallel to the direction of propagation of the signal;
- a second layer forming an array of waveguides;
- a fourth layer forming an array of ports;
- the second layer being interposed between the first and the fourth layer;
- each waveguide being intended to transmit a radiofrequency signal in one or other direction between a port of the fourth layer and a radiating element;
- the surface area of the first layer being smaller than the surface area of the fourth layer;
- the waveguides approaching one another between the fourth layer and the first layer.

Thus the waveguides have a double function; on the one hand, they enable the signals to be transmitted between the ports of the fourth layer and the radiating elements of the first layer, and on the other hand they enable the spacing of the radiating elements and the spacing of the ports of the fourth layer to be chosen independently.

In a first embodiment, the waveguides approach one another between the fourth layer and the first layer, in a converging manner. The surface area of the first layer is then smaller than the surface area of the fourth layer.

Thus this arrangement enables the spacing between the radiating elements of the first layer to be reduced, in order to reduce the amplitude of the undesirable side lobes ("grating lobes").

For this purpose, the spacing (p1) between two radiating elements of the first layer is preferably less than $\lambda/2$, $\lambda$ being the wavelength at the maximum operating frequency.

The converging arrangement of the waveguides from the fourth layer toward the radiating elements thus enables the ports of the fourth layer to be spaced apart. The wide spacing between the ports makes it possible, for example, to position the electronic amplification and phase-shifting circuit supplying each port in the immediate vicinity of each port, reducing the constraints on the dimensions of this circuit. This wide spacing also enables polarizers of sufficient size to be positioned in the proximity of each port if necessary, to provide effective separation of the signals according to their polarization.

In another embodiment, the surface area of the first layer is larger than the surface area of the fourth layer. The waveguides then become more distant from one another between the fourth layer and the first layer. This embodiment enables relatively large radiating elements to be used, without requiring a large port layer.

The arrangement of the radiating elements of the first layer may be different from the arrangement of the ports of the fourth layer. For example, the radiating elements of the first layer may be positioned in a rectangular matrix M×N, while the ports of the fourth layer are positioned in a rectangular matrix K×L, M being different from K and N being different from L. This different arrangement may also result in different shapes, for example a rectangular arrangement on one of the layers and a circular, oval, cross-shaped, hollow rectangle, polygonal, or other arrangement on the other layer.

The radiofrequency module may comprise a third layer interposed between the second and the fourth layer.

The elements of the third layer may cause a transformation of the signal.

The third layer may also comprise an array of elements providing a cross section adaptation between the output cross section of the ports of the fourth layer and the differently-shaped cross section of the waveguides. A third layer of this type may, notably, be provided when only the ports or only the waveguides are ridged.

The third layer interposed between the second layer and the fourth layer may also comprise an array of polarizers as elements.

In a variant, the radiofrequency module may comprise external polarizers immediately after the radiating elements in the air.

The third layer interposed between the second and the fourth layer may comprise a filter.

Each radiating element of the first layer may be provided with at least one ridge parallel to the direction of propagation of the signal.

The radiating elements of the first layer may also be non-ridged and may consist of open waveguides or square, circular, pyramidal or spline-shaped horns.

The radiating elements may have an external cross section which is square, rectangular, or preferably hexagonal, circular or oval.

The spacing (p1) between two radiating elements may be variable within the module.

The radiofrequency module may comprise waveguides having a square, rectangular, round, oval or hexagonal cross section, the inner faces of which are provided with at least one ridge extending longitudinally along each inner face of the waveguides.

Each waveguide of the second layer is preferably designed to transmit either a fundamental mode only, or a fundamental mode and a single degenerate mode.

The lengths of the different waveguides of the second layer are advantageously identical.

The lengths of the different waveguides of the second layer may also be variable; in this case, it is preferable to use waveguides that are isophase at the wavelength concerned, that is to say waveguides that all produce an identical phase shift.

In one embodiment, the different waveguides have different lengths and different cross sections, so as to compensate the phase variation produced by the different lengths. The different waveguides are preferably isophase; that is to say, the phase shifts across the different waveguides are identical.

The channels of different waveguides are preferably non-rectilinear.

The waveguides of the second layer are preferably curved.

The curvature of the different waveguides of the second layer may be variable. For example, the waveguides at the periphery may be more curved than the waveguides in the center.

The ports of the fourth layer may form the inputs of a polarizer.

A first end of all the waveguides may be located in a first plane, while a second end of all the waveguides is located in a second plane.

The module is advantageously a module formed by additive manufacturing.

Additive manufacturing may be used, notably, to form waveguides having a complex shape, notably curved waveguides converging in funnel fashion between the layer of radiating elements and the layer of polarizers.

"Additive manufacturing" is taken to mean any method of manufacturing parts by the addition of material, according to computer data stored on a computer medium and defining a model of the part. In addition to stereolithography and selective laser melting, the expression denotes other methods of manufacture by the setting or coagulation of liquid or powder, notably including, but not limited to, methods based on ink jets (binder jetting), DED (Direct Energy Deposition), EBFF (Electron beam freeform fabrication), FDM (fused deposition modeling), PFF (plastic freeforming), the use of aerosols, BPM (ballistic particle manufacturing), powder bed, SLS (Selective Laser Sintering), ALM (additive Layer Manufacturing), polyjet, EBM (electron beam melting), photopolymerization, etc. However, manufacturing by stereolithography or selective laser melting is preferred, because it enables parts to be produced with relatively clean surface states having low roughness.

The module is preferably monolithic.

Monolithic manufacture of the module enables costs to be reduced, while avoiding the need for assembly. It also makes it possible to ensure the precise relative positioning of the different components.

The invention also relates to a module comprising the above elements and to an electronic circuit with amplifiers and/or phase shifters connected to each port.

BRIEF DESCRIPTION OF THE DRAWINGS

Examples of embodiment of the invention are indicated in the description illustrated by the appended drawings, in which.

EXAMPLE(S) OF EMBODIMENT OF THE INVENTION

Figure 1:
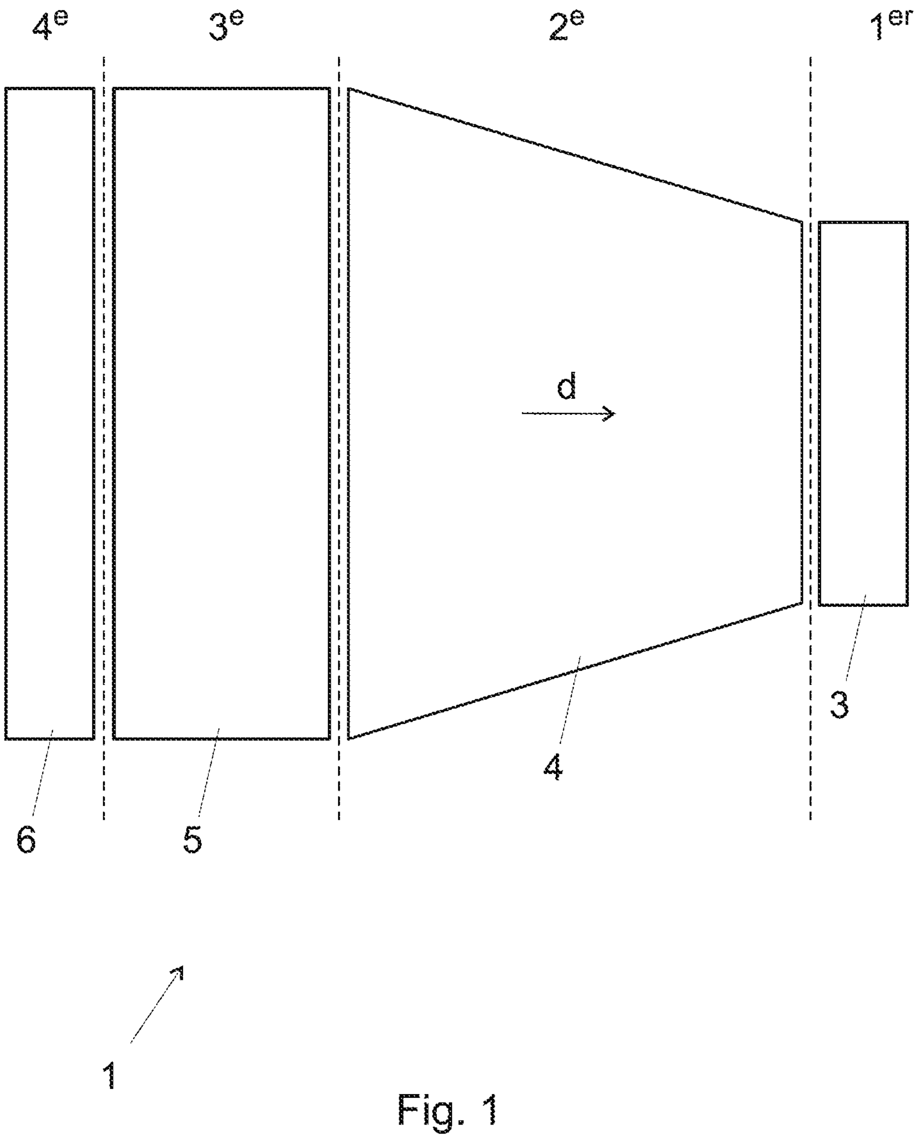
FIG. 1 shows a schematic side view of the different layers of a module according to the invention.

FIG. 1 shows a passive radiofrequency module 1 according to a first embodiment of the invention, intended to form the passive part of a direct radiating array (DRA).

The radiofrequency module 1 comprises four layers 3, 4, 5, 6.

Of these layers, the first layer 3 comprises a two-dimensional array of N radiating elements 30 (antennas) for transmitting electromagnetic signals into the ether, or for receiving the received signals.

The second layer 4 comprises an array of waveguides 40.

The third layer 5 is optional; it may also be integrated into the layer 4. If present, the third layer 5 comprises an array of elements 50, for example polarizers or cross section adapters.

The fourth layer 6 comprises a two-dimensional array, for example a rectangular matrix, with N waveguide ports 60. Each port 60 forms an interface with an active element of the DRA such as an amplifier and/or a phase shifter, forming part of a beamforming array. Thus a port enables a waveguide to be connected to an electronic circuit for the purpose of injecting a signal into the waveguides, or, in the opposite direction, receiving electromagnetic signals in the waveguides.

It is also possible to use 2N ports 60A, 60B, if a linearly or circularly polarized antenna is used.

Instead of integrating the polarizers into the third layer 5, it is possible to use a layer of polarizers between the first layer 3 with the radiating elements and the second layer 4 with the waveguides, or to integrate polarizers into the radiating elements. This solution has the advantage of bringing the polarizers of the radiating elements closer together, and avoiding the complexity of transmitting a signal with a number of polarities in each waveguide.

This module 1 is intended to be used in a multibeam environment. The radiating elements 30 are preferably brought closer together so that the spacing p1 between two adjacent radiating elements is smaller than the wavelength at the nominal frequency at which the module 1 is to be used. In this way the amplitude of the secondary transmission and reception lobes is reduced.

Figure 3A:
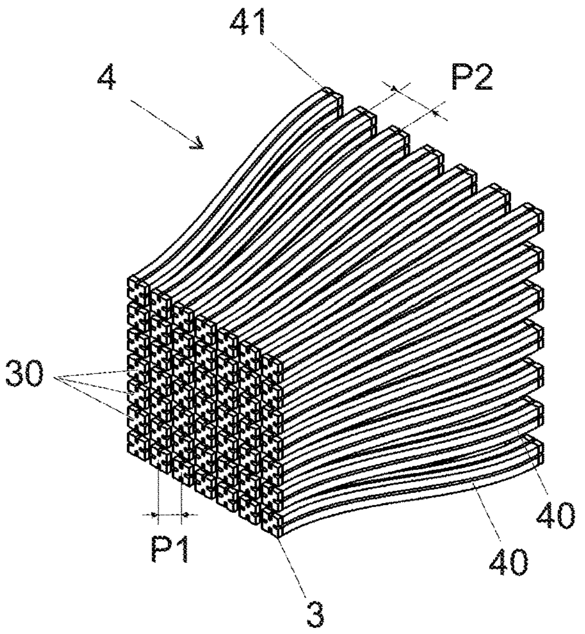
FIG. 3A shows a perspective view of the second and third layer of an example of a module according to the invention.
Figure 3B:
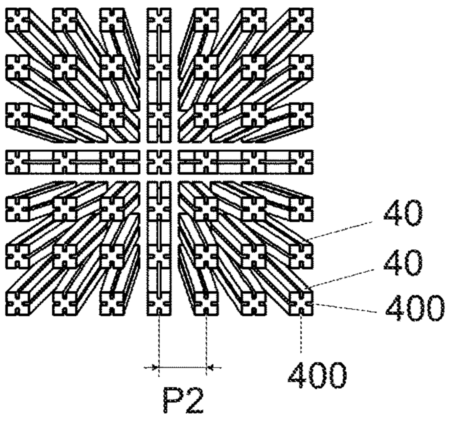
FIG. 3B shows a front view of the second and third layer of an example of a module according to the invention, viewed from the third layer.
Figure 3C:
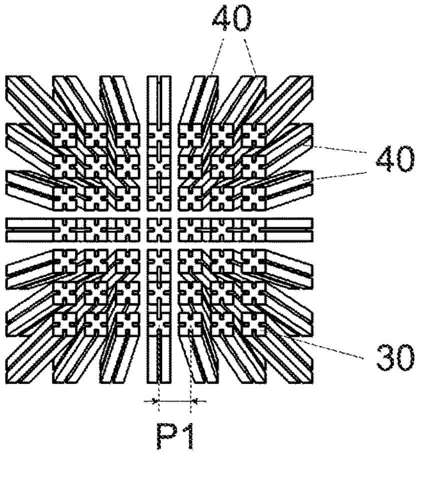
FIG. 3C shows a front view of the second and third layer of an example of a module according to the invention, viewed from the side corresponding to the first layer.

FIGS. 3A to 3C show different views of an example of a module according to a first embodiment of the invention, without the third and fourth layer. In this example, the waveguides 40 and the radiating elements 30 have a square cross section provided with four ridges arranged symmetrically on the inner sides. The waveguides converge toward the first layer 3.

FIGS. 7 to 10 show other views of an example of a module similar to that of FIGS. 3A to 3C, but in which the waveguides 40 and the radiating elements 30 have a rectangular cross section provided with two ridges positioned in the middles of the long sides of the inner sides. The waveguides again converge toward the first layer 3.

In these embodiments of FIGS. 3A to 3C and 7 to 10, the distance between two adjacent ports 60 of the fourth layer 6 is preferably greater than the wavelength at the nominal frequency at which the module 1 is to be used. This arrangement enables the radiating elements 30 to be brought closer to one another, in order to reduce the undesirable secondary lobes in reception and transmission, while spacing apart the ports 60 of the fourth layer 6, in order to facilitate connection to the active electronic elements for transmitting or receiving a signal in each waveguide.

The first layer 3 comprising an array of radiating elements 30, thus has a smaller surface area, in a plane perpendicular to the direction d of propagation of the signal, than the fourth layer 6 with the array of ports 60. The spacing p1 between two corresponding points of two adjacent radiating elements 30 is therefore smaller than the spacing p2 between two corresponding points of two adjacent ports 60.

The spacing p1 between adjacent elements may be identical in the two orthogonal directions, or different. Similarly, the spacing p2 between adjacent elements may be identical in the two orthogonal directions, or different.

Figure 11:
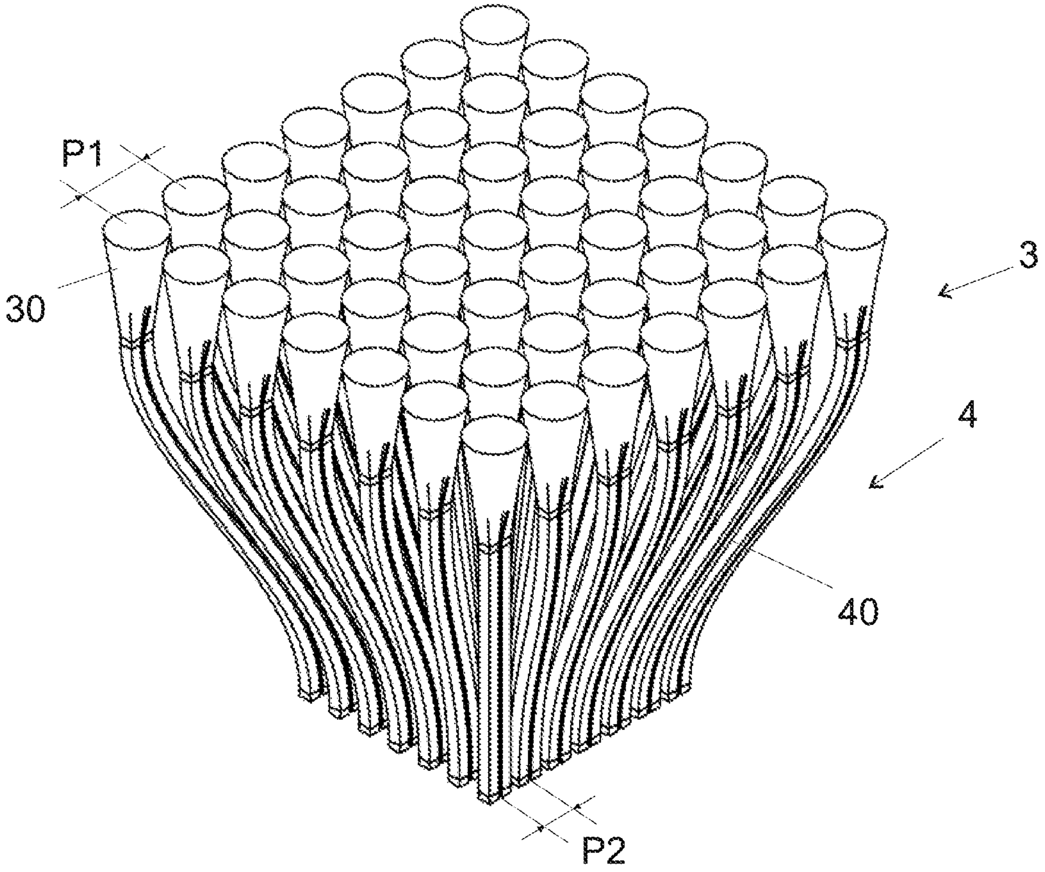
FIG. 11 shows a perspective view of a module comprising a set of waveguides diverging toward the radiating elements of the first layer, according to a fourth embodiment of the invention.
Figure 12:
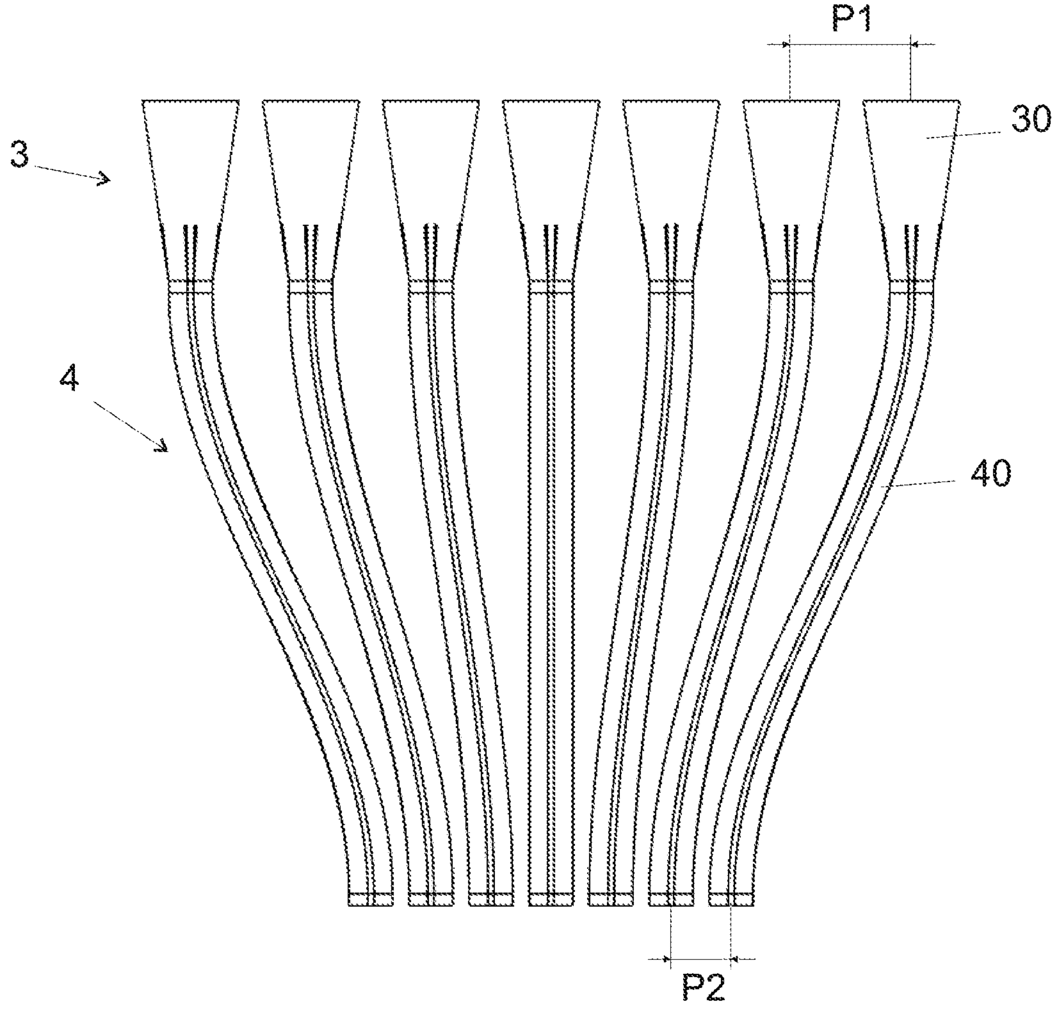
FIG. 12 shows a side view of the module according to the fourth embodiment of the invention.

FIGS. 11 to 12 show another embodiment of a module according to the invention, in which the waveguides 40 diverge toward the radiating elements 30. The surface area of the first layer 3 is thus greater than the surface area of the fourth layer 6, and the spacing p1 between radiating elements 30 of the first layer 3 is greater than the spacing p2 between the ports of the fourth layer 6. This arrangement makes it possible to provide a module with radiating elements 30 of large size, horn-shaped for example, without increasing the overall dimensions of the ports 60 and of the array of active elements (not shown) connected to these ports.

FIGS. 3A to 3C and 7 to 12 show waveguides 40 that are separate from one another. In a preferred embodiment, however, these waveguides are linked to one another so as to maintain their relative positions and form an assembly which is preferably monolithic. The link between the waveguides may be established, for example, by the first layer 3, the third layer 5 and/or the fourth layer 6. It is also possible to provide retaining elements in the form of bridges between different waveguides.

Figure 4:
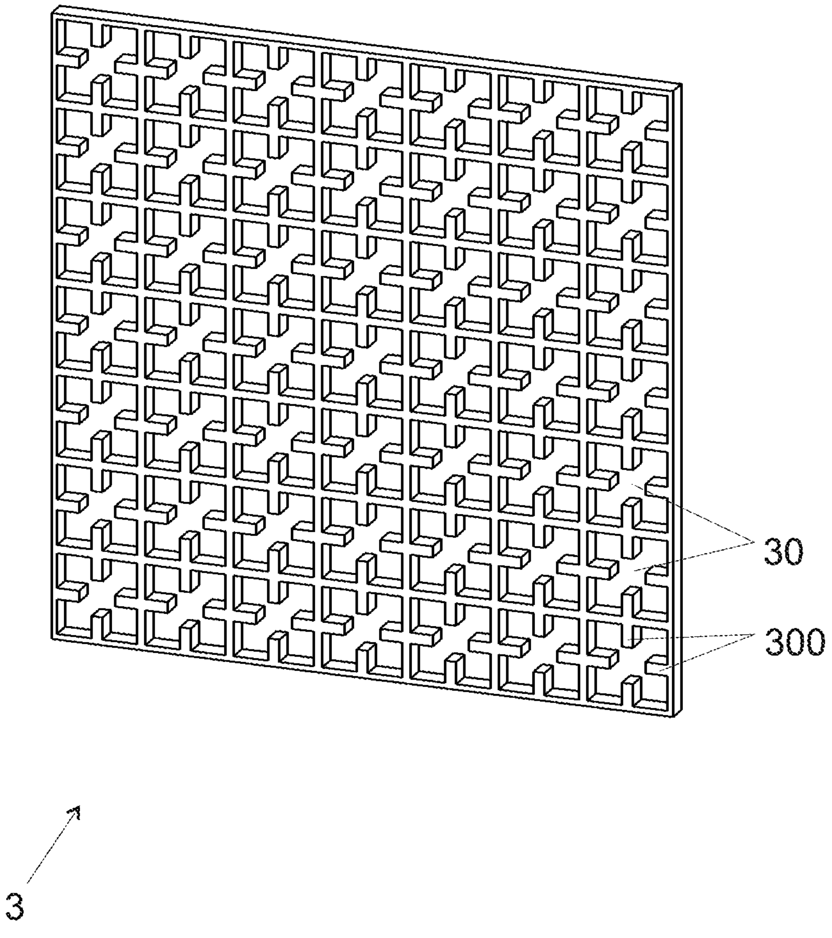
FIG. 4 shows a perspective view of an example of a first layer of a module according to the invention.

An example of an array of radiating elements 30 in the layer 3 is shown in FIG. 4. In this example, the N radiating elements 30 are arranged in a rectangular matrix, in this case a square matrix. The cross section of each radiating element 30 is square and is provided with a ridge 300 on each inner edge, the arrangement of the ridges being symmetrical. Adjacent radiating elements share a common lateral edge, enabling them to be brought even closer together.

The phase and amplitude of each radiating element of the first layer 3 enable a high degree of isolation to be provided between the different beams. The radiating elements having a size that is smaller than the wavelength reduce the effect of the secondary lobes in the region covered.

Figure 6:
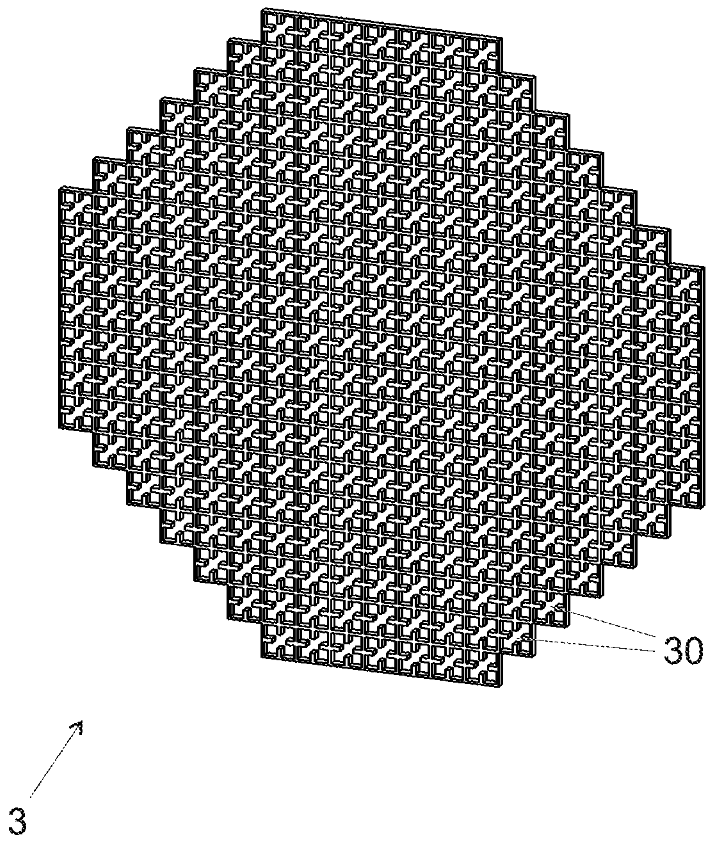
FIG. 6 shows a front view of another example of a first layer of a module according to a second embodiment of the invention.

FIG. 6 shows another example of a first layer 3 of radiating elements consisting of lines of radiating elements 30 with a variable number of radiating elements along the lines, the general shape of the layer forming an octagon.

It is also possible to provide first layers 3 with radiating elements 30 phase-shifted in the successive lines, the value of the phase shift possibly being smaller than the spacing p1 between two adjacent elements 30 on the same line.

A first layer 3 of any polygonal shape, or of a substantially circular shape, may also be provided.

The radiating elements 30 may also be arranged in a triangle, a rectangle or a lozenge, with lines aligned or phase-shifted.

In the embodiments shown in FIGS. 1 and 3 to 6, the elements 30 preferably consist of waveguides whose inner cavities are provided with ridges 300, for example two or four ridges 300 distributed at equal angular distances.

Figure 5A:
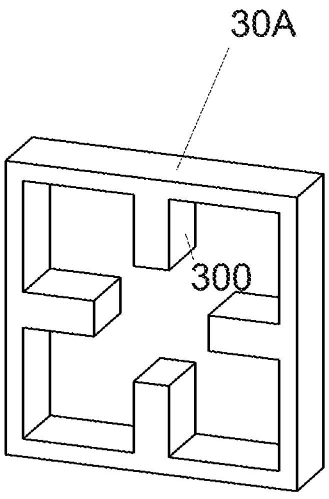
FIGS. 5A to 5C show three examples of radiating elements that may be used in the first layer of a module according to the invention.
Figure 5B:
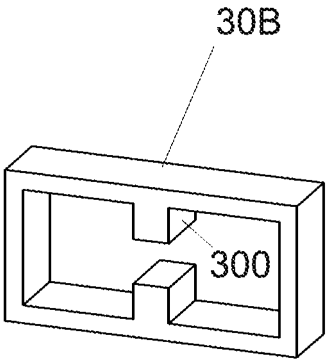
Figure 5C:
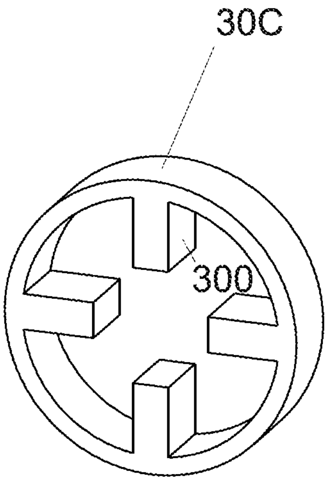

FIG. 5A shows an example of a radiating element having a square cross section with four ridges, referred to as "quad-ridge square" FIG. 5B shows an example of a radiating element having a rectangular cross section with two ridges, called "quad-ridge square" FIG. 5C shows an example of a radiating element having a circular cross section with four ridges, called "quad-ridge circular" The design of the radiating elements with these ridges as shown makes it possible to provide radiating elements with smaller dimensions than the wavelength of the signal to be transmitted or received.

Other shapes of radiating elements supporting at least one propagation mode may be used, including rectangular, circular or rounded shapes, which may or may not be ridged. There may be 2, 3 or 4 ridges.

The radiating elements 30 may be single-polarized or dual-polarized. The polarization may be linear, inclined or circular.

The spacing p1 between two radiating elements 30 of the first layer 3 is preferably less than or equal to ⍰/2, ⍰ being the wavelength at the maximum frequency for which the module is intended.

The radiating elements may include polarizers which are not shown, for example at the junction with the second layer 4. In another embodiment which is not shown, polarizers are provided immediately after the portion of free air in which the transmitted signal is radiated. As described below, the polarizers may also be provided in the third layer 5.

The second layer 4 comprises N waveguides 40. Each waveguide 40 transmits a signal from a port 60 and/or an element of the third layer 5 toward a corresponding radiating element 30 for transmission, and vice-versa for reception. The waveguides 40 also provide a conversion between the arrangement of the elements 60 on layers 5 and 6 and the different arrangement of the first layer of radiating elements 3.

The waveguides 40 preferably have a cross section of practically constant shape and size.

The waveguides 40 are preferably curved so as to form the transition between the surface of the third or fourth layer 5 and the different surface of the first layer 3 of radiating elements. The waveguides thus form a funnel-shaped volume. In the embodiments of FIGS. 1, 3A to 3C and 7 to 10, the waveguides converge toward the first layer 3. In the embodiment of FIGS. 11 to 12, they diverge toward this first layer 3.

The second layer 4 may not only enable the spacing to be adapted between adjacent elements; in one embodiment, it may also be formed so as to provide a transition between the arrangement of the radiating elements 30 of the first layer 3 and a different arrangement of the ports 60 of the fourth layer 6. For example, the second layer 4 may provide a transition between an array of elements or ports arranged in a rectangular matrix and an array or elements or ports arranged in a different matrix, or in a polygon, or in a circle.

Figure 7:
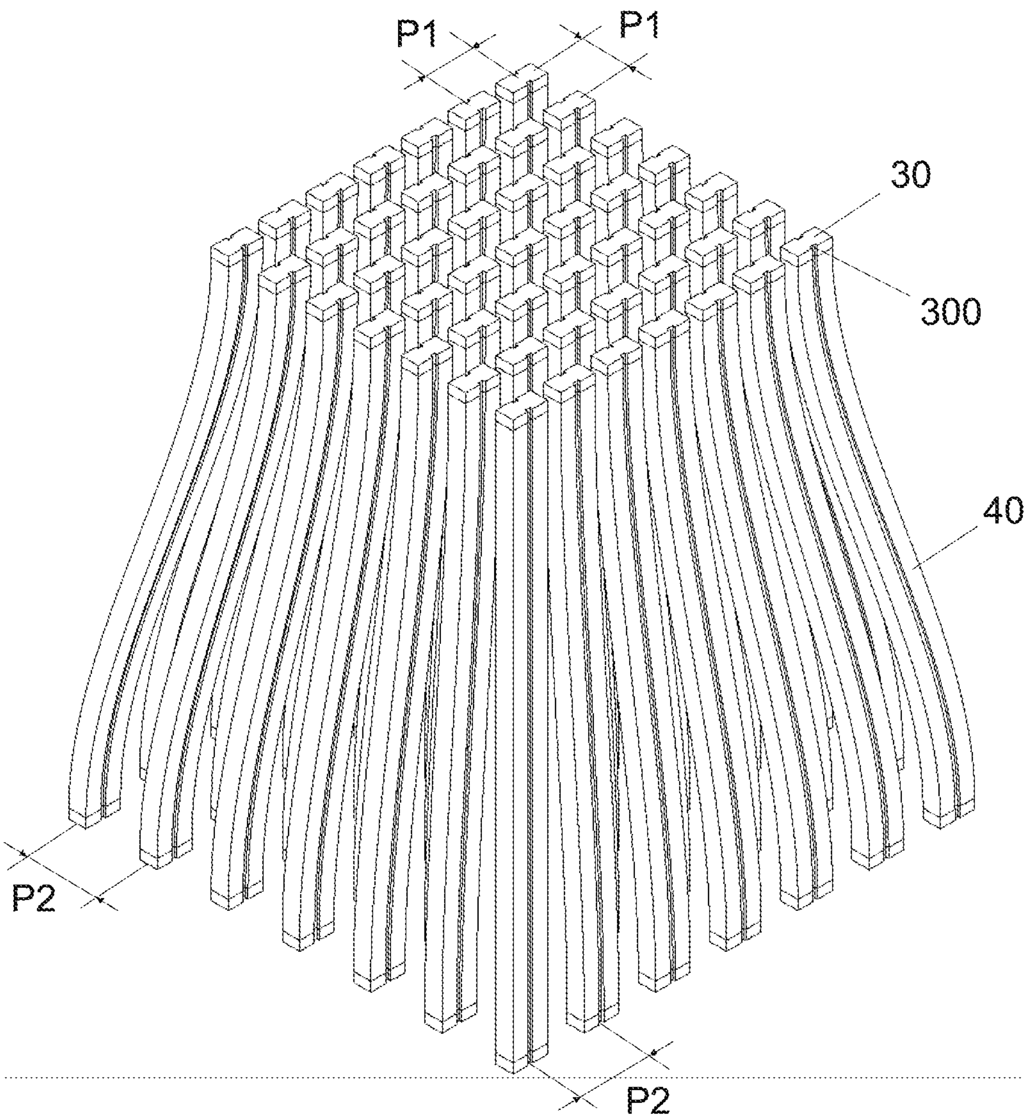
FIG. 7 shows a perspective view of a module comprising a set of waveguides converging toward the radiating elements of the first layer according to a third embodiment of the invention.
Figure 8:
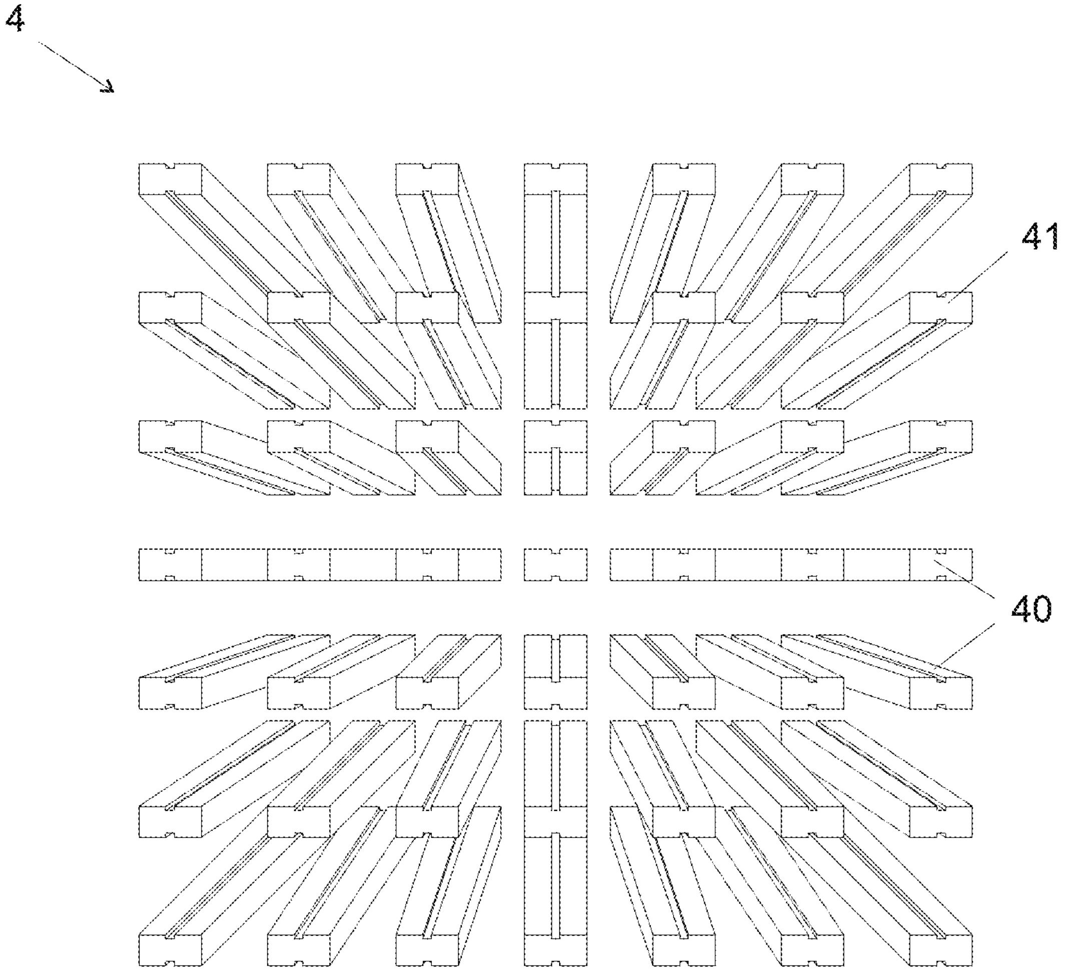
FIG. 8 shows a view from the fourth layer of the module according to the third embodiment of the invention.
Figure 9:
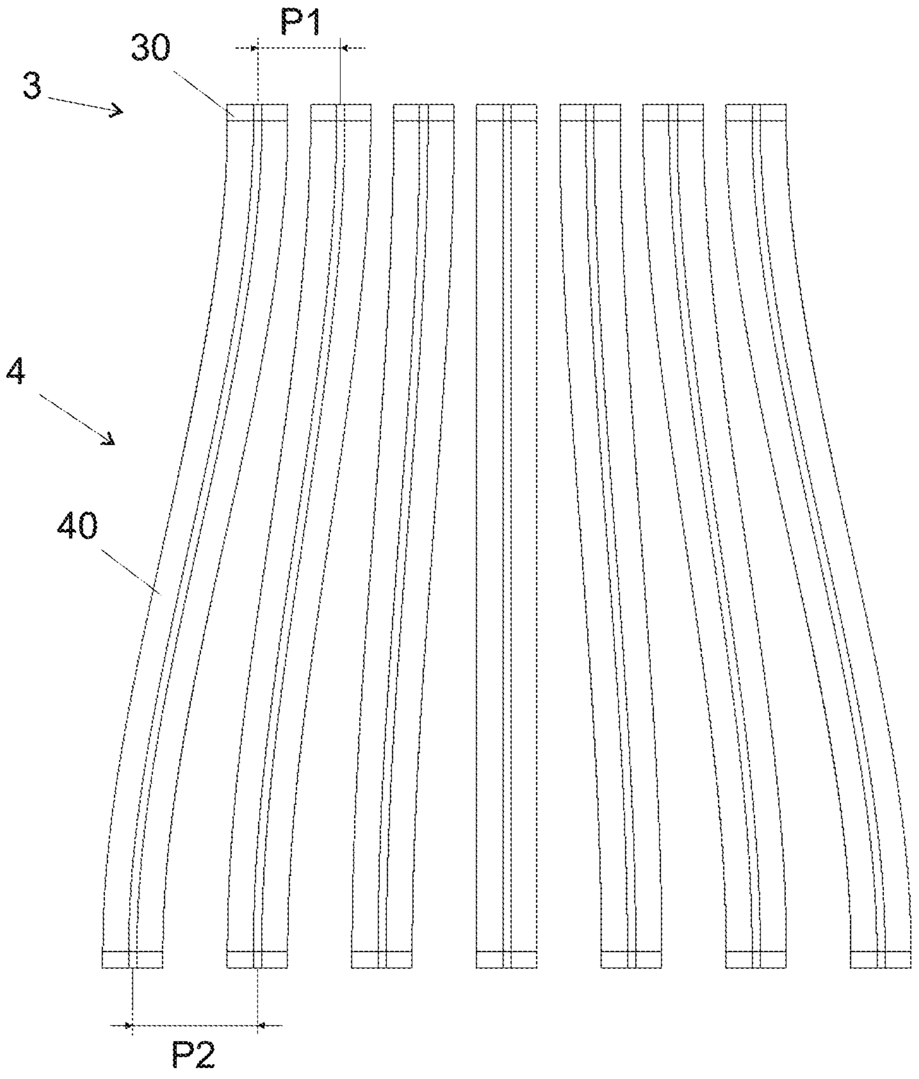
FIG. 9 shows a side view of the module according to the third embodiment of the invention.
Figure 10:
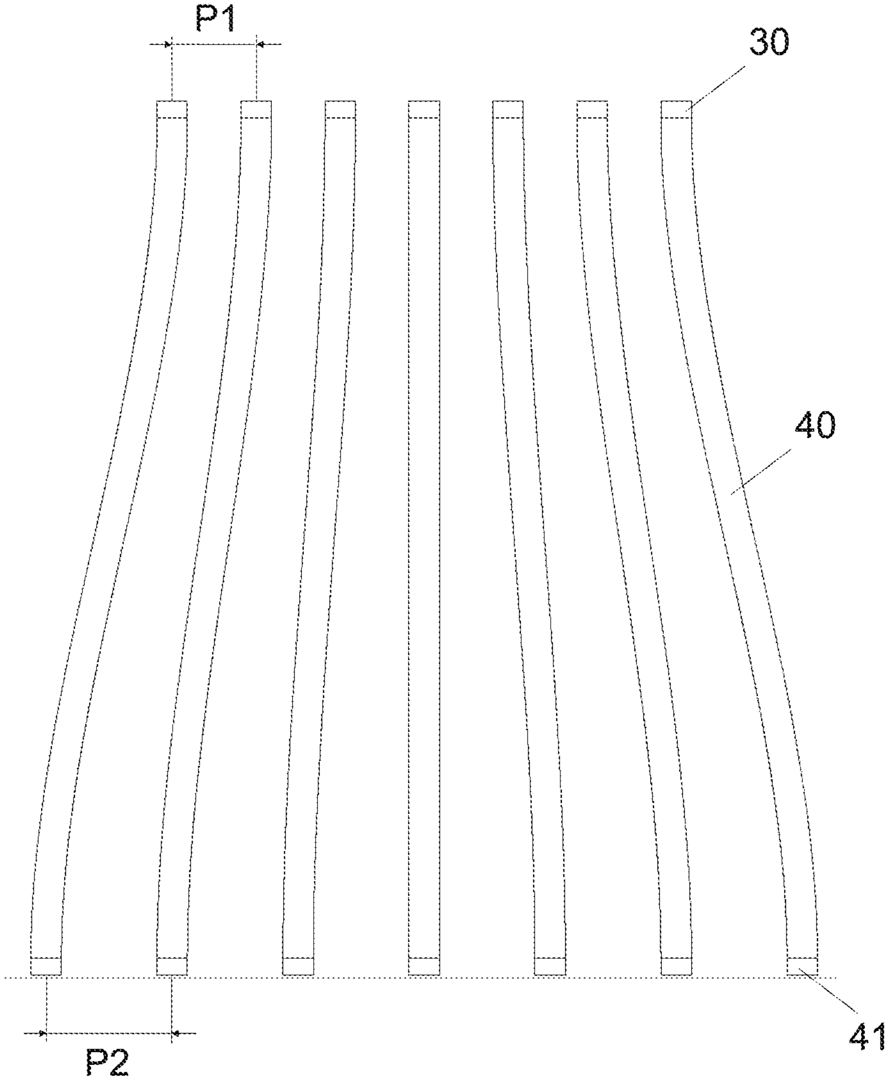
FIG. 10 shows another side view of the module according to the third embodiment of the invention.

At least some waveguides 40 are curved, as shown for example in FIGS. 3A, 7 and 11. In particular, at least some waveguides are curved in two planes perpendicular to one another and parallel to the longitudinal axis d of the module, as shown, notably, in FIGS. 9 and 10 (first embodiment) and 12 (second embodiment). These waveguides 40 are thus curved in an S-shape in two planes orthogonal to one another and parallel to the main direction d of transmission of the signal.

The plane of connection between the waveguides 40 and the radiating elements 30, on the one hand, and the plane of connection between the waveguides 40 and the elements 50, on the other hand, are preferably parallel to one another and perpendicular to the main direction d of transmission of the signal.

The waveguides 40 at the periphery of the second layer 4 are more curved than those near the center, and are longer. The waveguides 40 near the center may be rectilinear.

The dimensions of the inner channel through the waveguides 40 and those of the layer 41, as well as their shapes, are determined as a function of the operating frequency of the module, that is to say the frequency of the electromagnetic signal for which the module 1 is manufactured and for which a transmission mode that is stable, and that optionally has a minimum of attenuation, is obtained.

As has been seen, the different waveguides 40 in the second layer 4 have different lengths and curvatures, which affect their frequency response curve. These differences may be compensated by the electronic system supplying each port 60 or processing the received signals. Preferably, these differences are compensated at least partially by adapting the cross sections of the different waveguides 40, which then have different shapes and/or dimensions from one another.

The lengths of the different waveguides 40 of the second layer are advantageously identical, making it possible to provide identical phase shifting of the signals passing through the different waveguides, and therefore to maintain their relative phase shift.

The lengths of the different waveguides 40 may be different; in this case, it is preferable to use waveguides that are isophase at the wavelength concerned, that is to say waveguides that all produce an identical phase shift. For this purpose, in one embodiment, the different waveguides have different lengths and different cross sections, so as to compensate the phase variation produced by the different lengths.

It is also possible to use waveguides having different lengths, and/or producing different phase shifts, and to use or compensate these phase shifts with the network of active electronic phase-shifting circuits, in order to control the relating phase shift between radiating elements, and, for example, to control the beamforming.

Depending on the embodiments, the second layer 4 may also include other waveguide elements such as filters, polarization converters or phase adapters.

Each waveguide 40 may be intended to transmit a single-polarized or a dual-polarized signal.

The third layer 5 is optional and comprises elements 50. In one embodiment, the elements 50 enable a transition to be provided between the cross section of the ports 60 of the fourth layer 6 and the cross section, which may be different, of the waveguides 40 of the second layer 4, generally corresponding to the cross section of the radiating elements of the first layer 3. The waveguides of the third layer 5 provide, for example, a transition between the square or rectangular cross sections of the outputs of the ports 60 and the cross sections of the waveguides 40 and of the radiating elements 30, which are provided with ridges 400 and 300 respectively.

Depending on the embodiments, the elements 50 of the third layer 5 may also provide conversion of the signal, for example by using other waveguide elements such as filters, polarization converters, polarizers, phase adapters or others.

The transverse surface area of the third layer 5 is preferably equal to the transverse surface area of the fourth layer 6.

Figure 2:
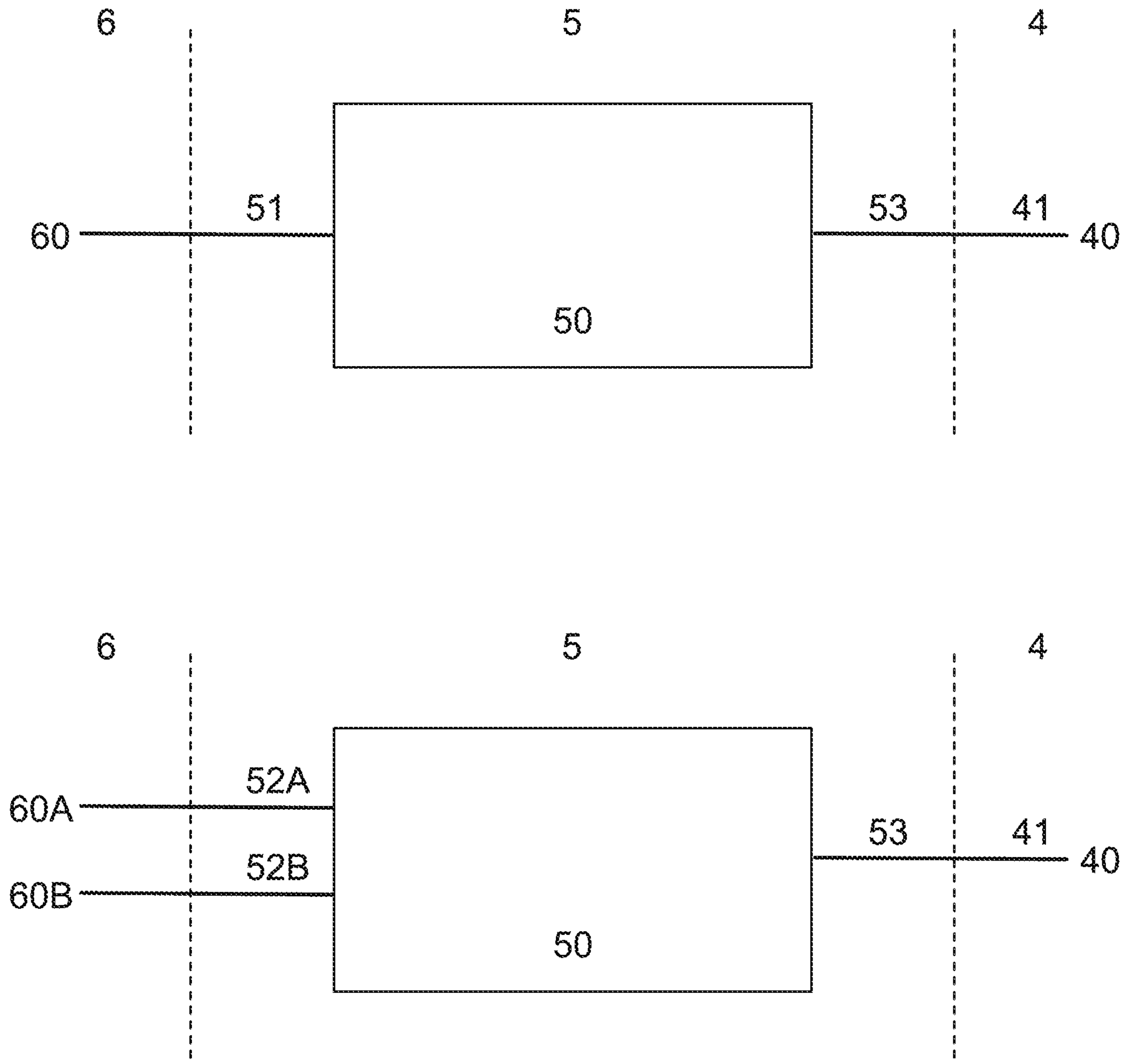
FIG. 2 shows two examples of embodiment of the third layer, in which each element of this layer comprises either one or two inputs on the side facing the fourth layer.

FIG. 2 shows an example of an element 50 of the third layer 5. In the embodiment in the upper part of the figure, this element 50 comprises an input 51 connected to a port 60 and an input 53 connected to the input 41 of a waveguide 40.

In the embodiment in the lower part of the figure, this element 50 comprises two inputs 52A, 52B, each being connected to a port 60A or 60B, respectively, of the fourth layer, and an input 53 connected to the input 41 of a waveguide 40. In this embodiment, the element 60 preferably comprises a polarizer for combining or separating two polarities on the ports 60A, 60B from/toward a combined signal on the waveguide 40.

The assembly of the module 1 is preferably formed in a monolithic manner, by additive manufacturing. The assembly of the module 1 may also be formed in a plurality of units assembled together, each unit comprising the four layers 3, 4, 5, 6 or at least layers 3, 4 and 6. Manufacturing by subtractive machining or by assembly is also possible.

In one embodiment, the module is made entirely of metal, for example aluminum, by additive manufacturing.

In another embodiment, the module 1 comprises a core of polymer, PEEK, metal or ceramic, and a conductive shell deposited on the faces of this core. The core of the module 1 may be formed of polymer material, ceramic, metal or an alloy, for example an aluminum, titanium or steel alloy.

The core of the module 1 may be formed by stereolithography or by selective laser melting. The core may comprise different parts assembled together, for example by bonding or welding.

The metal layer forming the shell may comprise a metal chosen at will from among Cu, Au, Ag, Ni, Al, stainless steel, brass, or a combination of these metals.

The inner and outer surfaces of the core are covered with a conductive metal layer, for example copper, silver, gold nickel or the like, plated by chemical deposition without electric current. The thickness of this layer is, for example, between 1 and 20 micrometers, for example between 4 and 10 micrometers.

The thickness of this conductive coating must be sufficient for the surface to be electrically conductive at the chosen radio frequency. This is typically achieved by using a conductive layer whose thickness is greater than the skin depth δ.

This thickness is preferably substantially constant over all the inner surfaces, in order to provide a finished part with precise dimensional tolerances.

The conductive metal is deposited on the inner, and possibly outer, faces by immersing the core in a series of successive baths, typically 1 to 15 baths. Each bath requires a fluid with one or more reagents. The deposition does not require the application of a current to the core to be covered. Mixing and regular deposition are provided by mixing the fluid, for example by pumping the fluid in the transmission channel and/or around the module 1, or by vibrating the core and/or the fluid vessel, for example with an ultrasonic vibrating device to create ultrasonic waves.

The metal conductive shell may cover all the faces of the core in an uninterrupted manner. In another embodiment, the module 1 comprises lateral walls with outer and inner surfaces, the inner surfaces delimiting a channel, said conductive shell covering said inner surface but not all of the outer surface.

The module 1 may comprise a smoothing layer intended to smooth, at least partially, the irregularities of the core surface. The conductive shell is deposited on top of the smoothing layer.

The module 1 may comprise an adhesion (or priming) layer deposited on the core so as to cover it in an uninterrupted manner.

The adhesion layer may be made of conductive or non-conductive material. The adhesion layer enables the adhesion of the conductive layer to the core to be improved. Its thickness is preferably less than the roughness Ra of the core, and less than the resolution of the method of additive manufacturing of the core.

In one embodiment, the module 1 comprises, in succession, a non-conductive core formed by additive manufacturing, an adhesion layer, a smoothing layer and a conductive layer. Thus the adhesion layer and the smoothing layer enable the surface roughness of the waveguide channel to be reduced. The adhesion layer enables the adhesion of the conductive or non-conductive core to the smoothing layer and the conductive layer to be improved.

The shape of the module 1 may be determined by means of a computer file, stored on a computer data medium, for controlling an additive manufacturing device.

The module may be connected to an electronic circuit, for example in the form of a printed circuit mounted behind the port layer 5, with amplifiers and/or phase shifters connected to each port.

The invention claimed is:

1. A radiofrequency module, comprising:

a first layer comprising an array of radiating elements, each radiating element having a cross section for supporting at least one wave propagation mode, a second layer forming an array of waveguides;

a fourth layer forming an array of ports;

the second layer being interposed between the first and the fourth layer;

each waveguide being intended to transmit a radiofrequency signal in one or other direction between a port of the fourth layer and a radiating element of the first layer;

the surface area of the first layer being different from the surface area of the fourth layer;

the waveguides approaching one another between the fourth layer and the first layer, or between the first layer and the fourth layer, the array of radiating elements of the first layer forming a two-dimensional array in a first plane;

the array of ports of the fourth layer forming a two-dimensional array in a second plane, and each cross section of the first layer being provided with three ridges parallel to the direction of propagation of the signal, wherein the three ridges being spaced apart with an angular distance of 120°.

2. The radiofrequency module as claimed in claim 1, the surface area of the first layer being smaller than the surface area of the fourth layer;

the waveguides approaching one another between the fourth layer and the first layer.

3. The radiofrequency module as claimed in claim 2, the spacing (p1) between two radiating elements of the first layer being less than λ\2, λ being the wavelength at the maximum operating frequency.

4. The radiofrequency module as claimed in claim 1, the surface area of the first layer being larger than the surface area of the fourth layer;

the waveguides moving away from each other between the fourth layer and the first layer.

5. The radiofrequency module as claimed in claim 1, the radiating elements of the first layer being non-ridged and consisting of open waveguides with a square, rectangular, circular, hexagonal or octagonal cross section, or pyramidal or spline-shaped horns.

6. The radiofrequency module as claimed in claim 1, comprising a third layer interposed between the second layer and the fourth layer and comprising an array of elements providing a cross-section adaptation between the output cross section of the ports of the fourth layer and the differently-shaped cross section of the waveguides.

7. The radiofrequency module as claimed in claim 1, comprising a third layer interposed between the second layer and the fourth layer and comprising an array of elements comprising a polarizer.

8. The radiofrequency module as claimed in claim 1, comprising polarizers between the first and the second layer.

9. The radiofrequency module as claimed in claim 1, comprising a third layer interposed between the second layer and the fourth layer and comprising a filter.

10. The radiofrequency module as claimed in claim 1, each waveguide having a square, rectangular, hexagonal, round or oval cross section, the inner faces of which are provided with at least one ridge extending longitudinally along each inner face of the waveguides.

11. The radiofrequency module as claimed in claim 1, the lengths of the different waveguides of the second layer being variable.

12. The radiofrequency module as claimed in claim 11, the different waveguides having different lengths and different cross sections so as to compensate at least partially the differences in frequency response and/or the differences in phase caused by the different lengths and/or the different curvatures of the waveguides.

13. The radiofrequency module as claimed in claim 1, made by additive manufacturing.

14. The radiofrequency module as claimed in claim 13, formed by a monolithic element.

15. A radiofrequency module, comprising:

a first layer comprising an array of radiating elements, each radiating element having a cross section for supporting at least one wave propagation mode, a second layer forming an array of waveguides;

a fourth layer forming an array of ports;

the second layer being interposed between the first and the fourth layer;

each waveguide being intended to transmit a radiofrequency signal in one or other direction between a port of the fourth layer and a radiating element of the first layer;

the surface area of the first layer being different from the surface area of the fourth layer;

the waveguides approaching one another between the fourth layer and the first layer, or between the first layer and the fourth layer, the array of radiating elements of the first layer forming a two-dimensional array in a first plane;

the array of ports of the fourth layer forming a two-dimensional array in a second plane, and each cross section of the first layer being provided with three ridges parallel to the direction of propagation of the signal, wherein adjacent radiating elements share a common lateral edge.

* * * * *